United States Patent [19]

Freze

[11] 4,128,388

[45] Dec. 5, 1978

[54] GEYSERIC BURNER ASSEMBLY AND METHOD FOR COMBUSTING FUELS

[75] Inventor: Benjamin H. Freze, Garden Grove, Calif.

[73] Assignee: Challenge-Cook Bros., Inc., Industry, Calif.

[21] Appl. No.: 796,163

[22] Filed: May 12, 1977

[51] Int. Cl.² .............................................. F23D 15/00
[52] U.S. Cl. ................................... 431/116; 431/185; 431/9
[58] Field of Search ................... 431/9, 10, 185, 116, 431/285

[56] References Cited

U.S. PATENT DOCUMENTS

| | | | |
|---|---|---|---|
| 3,161,228 | 12/1964 | Brodlin | 431/9 |
| 3,480,375 | 11/1969 | Sitte | 431/158 |

FOREIGN PATENT DOCUMENTS 825124 12/1959 United Kingdom .................. 431/9

*Primary Examiner*—Alan Cohan
*Attorney, Agent, or Firm*—Lyon & Lyon

[57] ABSTRACT

Disclosed herein is a geyseric burner assembly for selectively and efficiently burning either oil or a gaseous fuel therein and discharging the combustion flow in an axial direction. The burner assembly includes a plurality of concentric shells defining an outer housing, a plenum which communicates with a forced air supply and an air passageway which delivers air for combustion from the plenum along the interior shells where the air is preheated to a toroidally shaped mixing ring which is disposed on an inclined floor about a gas pilot nozzle. Oil or gaseous fuel is selectively introduced to the burner toward the mixing ring where it mixes in a rolling or turbulent geyseric motion with the inflowing air resulting in instantaneous ignition and combustion.

14 Claims, 4 Drawing Figures

GEYSERIC BURNER ASSEMBLY AND METHOD FOR COMBUSTING FUELS

BACKGROUND OF THE INVENTION

The present invention relates to a burner assembly which can be selectively operated to burn either oil or gaseous fuels therein and which is highly suitable for numerous applications, as for example, in industrial dryers, boilers etc. Of primary importance in all oil or gaseous fuel burners is the mixing of the fuel with the incoming air just prior to combustion as the combustion process is critically dependent on a complete mixing of the fuel and air to achieve a maximum heat release and a clean burn. It is conventional, particularly with the burning of liquid fuels, to achieve this mixing with a highly turbulent action created by high speed rotation or circumferential movement of the combustion air and atomized fuel. This rotation or circumferential movement of air is accomplished by a variety of means such as tangential injection of the fuel and air into a circular burner, by means of stationary veins which impart rotational motion thereto, or the actual use of rotating fans. Unfortunately, uniform mixing does not always result from this rotational or circumferential movement and often stratification of the fuel and air occurs which results in less efficient combustion and often times causes a severe scorching of the burner walls. In addition, the combustion flow resulting from such mixing is often times unmanageable or difficult to control making uniform blending with secondary air for process heating relatively inefficient.

Other features which are desirable in such burner assemblies but which are often times compromised in those assemblies heretofore available include the promotion of a maximum heat generation in the shortest possible time and space thereby to impart the highest concentration of heat to the least amount of combustion air and to reduce the amount of heat loss through the metal walls of the burner by minimizing the area which is a function thereof. It is also desirable to provide a long flow path for the combustion gases to create the maximum "residence time" within the combustion chamber or burner so that the combustion process is complete before the products of combustion are discharged from the burner. This is particularly important in the case of liquid fuels which are atomized for burning because premature discharge into the atmosphere or secondary air often times results in recondensation of unburned fuel causing formation of carbon, undesirable smoke and odors and reduced heat release. It has also been found that the combustion process is further improved by preheating both the combustion air and fuel.

In addition to incomplete mixing of the fuel and air, another shortcoming of many of the burner assemblies currently available is their lack of flexibility. Such devices are generally constructed such that they can operate with only a single type of fuel, i.e., gas or fuel oil. In addition, any of such burner assemblies have a very small turn down ratio, i.e., the ratio of the maximum output to the minimum output with which the burner can effectively operate. By providing a burner assembly which could be selectively operated to burn either gas or fuel oil with the flip of a single switch and which had a large turn down ratio, the flexibility of the burner would be greatly increased not only for multiple applications but in a single installation as well for not only could different fuels be used depending upon availability, but the heat output could be regulated within a wide range to meet varying requirements. It would also be highly desirable to provide a fuel burner which could provide complete combustion in a compact combustion zone with low fuel and combustion air pressures. Many gas utility supplies have very limited pressure available and low combustion air pressure requires less horsepower and, therefore, less fan noise is produced.

Other desirable features of a burner assembly include a reduction in the noise generated by the combustion process itself, which reduction is certainly not found in the conventional burners employing high speed rotational or circumferential mixing. It is also an important requirement of the burner design to provide a strong stable pilot flame for reliable ignition of the main combustion gases. In addition, the pilot nozzle should be positioned so that it is not exposed to destructively high temperatures from the main combustion process. The length of the main combustion flame should be kept to a minimum which requires that most of the combustion be accomplished within the combustion chamber designed for that purpose.

SUMMARY OF THE INVENTION

Briefly, the invention comprises a burner assembly for selectively and efficiently burning oil or gaseous fuel therein. The burner assembly is comprised of a plurality of concentric shells defining an outer housing, a plenum which communicates with a forced air supply and an air passageway which delivers air for combustion from the plenum along the interior shells where the air is preheated to a toroidally shaped mixing ring which is disposed on an incline floor about a gas pilot nozzle. Oil or gaseous fuel is selectively introduced to the burner where it mixes in a rolling or turbulent geyseric motion with the inflowing air resulting in instantaneous ignition and combustion. The combustion flow passes upwardly through a discharge nozzle in axial alignment with the mixing ring and gas pilot nozzle.

It is the primary object of the present invention to provide an improved burner assembly which is selectively operative to burn oil or gaseous fuel therein.

It is another object of the present invention to provide a burner assembly which thoroughly mixes the combustion air and fuel for a more complete combustion.

It is yet another object of the present invention to provide a burner assembly which promotes maximum heat release and clean burning.

It is still a further object of the present invention to provide a burner assembly with a high turn down ratio.

It is yet another object of the present invention to provide a burner assembly which generates a minimum amount of noise during operation.

It is another object of the present invention to provide a burner assembly which promotes complete combustion in a compact combustion zone with low gas fuel pressure and low combustion air pressure.

These and other objects and advantages of the present invention will become apparent from the following detailed description taken in conjunction with the accompanying drawings.

IN THE DRAWINGS

Figure 1:
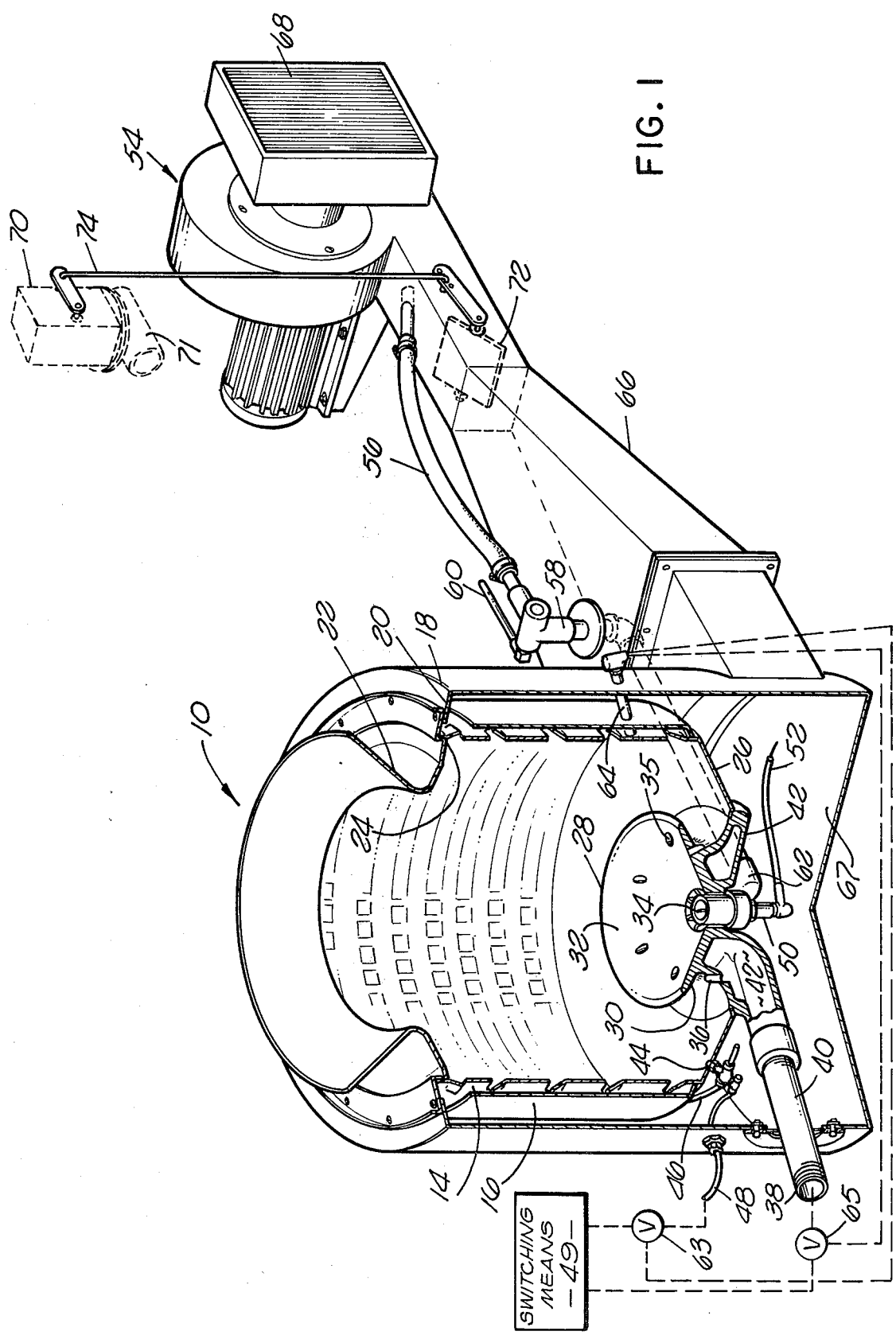
FIG. 1 is a perspective view of the burner assembly with a portion being broken away.
Figure 2:
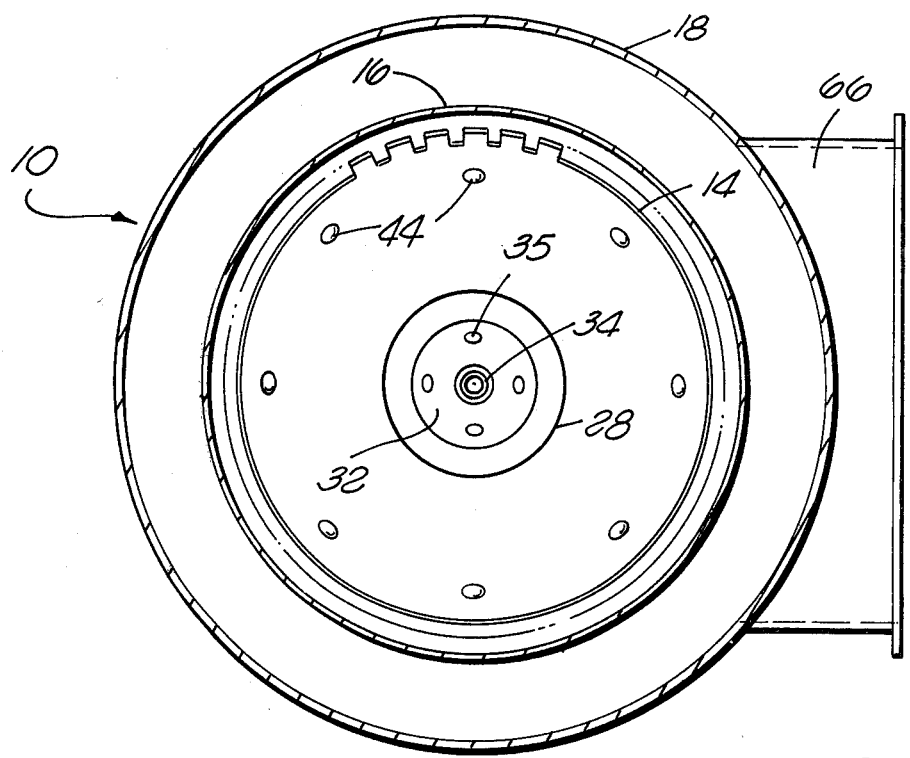
FIG. 2 is a plan view of the cylindrical burner.

Referring now in detail to the drawings, the burner assembly of the present invention includes a burner 10 which is comprised of an outer shell 12 defining the burner housing, an inner shell 14 and a shroud 16 disposed therebetween. The upper end 18 of the outer shell 12 is bent inwardly to define an annular flange 20. As seen in FIG. 1, a diverging discharge nozzle 22 is secured to flange 20 and to the upper end 24 of the inner shell 14. The lower ends of the inner shell 14 and shroud 16 are secured to a lower burning cone 26 which defines a sloping surface or raised interior floor for the burner, and a mixing ring 28 is mounted in the center of the burning cone 26 in axial alignment with nozzle 22.

Figure 3:
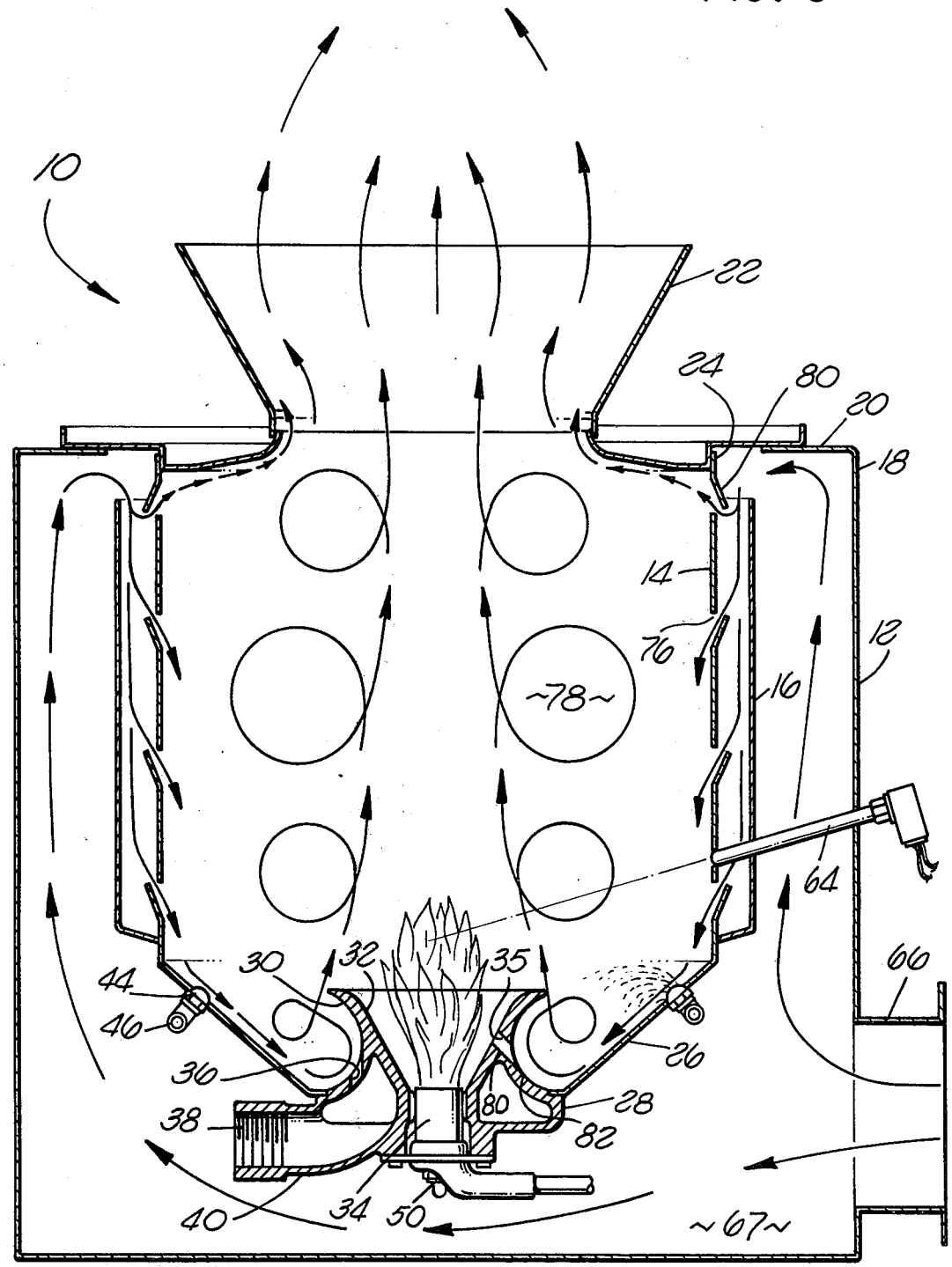
FIG. 3 is a sectional view of the burner including a flow diagram illustrating the geyseric mixing and combustion therein.

The mixing ring 28 is toroidally shaped and defines an annular curvilinear outer concave mixing surface 30 and a sloped inner surface 32 disposed about the gas pilot nozzle 34. The term toroidally shaped as used herein is not limited to a circular configuration and includes the oblong construction of the mixing ring illustrated in FIG. 4. As seen in FIGS. 1 and 3, the inner surface 32 of the mixing ring has a plurality of fuel/air bleed orifices 35 therein and the outer curvilinear mixing surface 30 has a plurality of vertically disposed gas main burner orifices 36 therein. The gas main burner orifices 36 communicate with a gas inlet 38 via conduit 40 and an annular chamber 42 for delivering the gaseous fuel to the outer mixing surface 30 of the mixing ring for mixing with the incoming combustion air in a manner to be described.

As an alternative to gaseous fuel, a plurality of oil fuel injection nozzles 44 are disposed about the lower burning cone 26. Each nozzle 44 is coupled to a supply of pressurized fuel oil via main line 48 and lines 46 which extend between the nozzles 44. Upon activation of a conventional selective switch 49, gas inlet 38 is closed and the injection nozzles 44 are activated to produce an atomized spray of fuel oil. As will be described, this atomized spray is then carried by incoming combustion air toward the outer mixing surface 30 along the lower cone 26. In this manner, the burner assembly can be used to operate effectively with either oil or a gaseous fuel.

To provide a pilot flame for the burner assembly, an ignition electrode 50 is carried by the pilot nozzle 34 and is electrically coupled with a power source (not shown) via cable 52. The pilot nozzle 34 receives an air supply from a compression air blower 54 via air line 56, a pilot gas/air mixing valve 58 and line 62. Gas is fed to the pilot nozzle 34 from a source (not shown) by way of a pilot gas inlet line 60, mixing valve 58 and line 62. The burner assembly is preferably provided with a pilot flame detector 64 which scans the gas pilot nozzle for the presence of a flame and in the preferred embodiment, activates conventional flow valves 63 and 65 to start the flow of gas and/or fuel oil to the burner. An ultraviolet flame scanner is well-suited for this purpose as it would not detect the presence of light other than ultraviolet and accordingly would not activate the flow valves if infrared light were given off from outside sources or such as would occur if a piece of metal within the burner were to get exceedingly hot.

In the preferred embodiment of the invention, the actuator 70 comprises a valve portion 71 for regulating gas flow to the gas inlet 38 and is operably connected to flow valve 63 for alternatively regulating the fuel oil flow therethrough to nozzles 44. Combustion air for the burner assembly is provided by the air blower 54 which delivers a supply of air through ducting 66 to a plenum 67 defined by the outer shell or burner housing 12, the intermediate shroud 16 and the lower burning cone 26. An air filter 68 is secured to the upstream end of the blower for removing foreign particles from the combustion air and a fuel to air ratio actuator 70 is provided to control a damper 72 mounted in ducting 66. By controlling the positioning of the damper in synchronism with fuel valves 71 and 63 the flow of combustion air from the blower to the plenum 67 is regulated and the temperature generated by the combustion process is controlled. Actuator 70 can be of conventional construction and is responsive to an external signal which can be provided from a control panel, timer, heat temperature switch or the like. A simple mechanical linkage 74 as that shown in FIG. 1 is sufficient to provide the necessary control over the damper 72.

FIG. 3 is illustrative of the flow pattern of the fuel, air and combustion gases within the burner assembly. As shown therein, during operation combustion air is supplied to the burner by blower 54 through ducting 66 to the plenum 67 with the blower housing. A portion of this air is bled off through air line 56 to the pilot nozzle 34. As the combustion air enters the plenum, it is directed upwardly between the outer shell 12 and intermediate shroud 16 of the burner 10, over the top of the shroud and downwardly between the shroud 16 and inner shell 14. The inner shell 14 is provided with a plurality of louvers 76 therein for directing this downward flow of air into the interior chamber 78 of the burner adjacent the inner shell. The uppermost louvers 80 in the inner shell 14 which are disposed adjacent the discharge nozzle 22 are, however, oppositely disposed so as to direct a small portion of the air upwardly along the underside of the discharge nozzle and outwardly therefrom with the combustion gases.

As the combustion air is forced into the plenum, upwardly between the outer shell and intermediate shroud and into the burner chamber along the inner shell 14, it is preheated to improve combustion. If gaseous fuel is being used in the burner assembly and gas inlet is accordingly open and the fuel oil injector nozzles closed, the gaseous fuel passes through the main burner apertures 36 in the underside of the mixing ring 28 whereupon it is mixed or rolled in a geyser-like action with the combustion air passing along the lower burner cone 26. This geyseric mixing action is initiated at the curvilinear outer mixing surface 30 of the mixing ring and continues in a mushroom-like cloud as the combustion flow ascends within chamber 78 and discharges from the burner thorugh the diverging discharge nozzle 22 in an axial direction. This highly turbulent mixing results in a very uniform and symmetrical heat release through the burner nozzle. The torodial mixing ring 28 therefore not only mixes the fuel and combustion air but also serves as the main gas nozzle, a pilot adapter and a shield for protecting the gas pilot nozzle from the extreme heat of combustion. In addition, the location and configuration of the mixing ring and of the lower burning cone 26 which generate the geyseric boiling and resulting mushroom turbulence of the combustion gases dictates a lengthly path of travel resulting in a longer residence time of the combustion gas within the burner to insure completion of combustion prior to discharge.

If the burner assembly 10 is to be used with fuel oil as opposed to gaseous fuel, selective fuel switch 49 is selectively activated to open the fuel line leading to the injection nozzles 44 mounted in the lower burning cone 26 and close the gas inlet 38 leading to the main gas burner orifices 36 in the underside of the mixing ring. The burner assembly then operates as with the gaseous fuel except that an atomized spray of fuel oil is directed from the injection nozzles 44 by the incoming combustion air along lower cone 26 toward the outer curvilinear surface 30 of the mixing ring. Geyseric mixing of the atomized fuel oil and combustion air then proceeds in the same manner as with the combustion air and gaseous fuel. As noted above, the counterflow between the incoming combustion air passing along the interior of the inner shell 14 and the hot gases rising within the burner chamber 78 preheat the air and the atomized fuel to the varporization point (about 700° Fahrenheit) whereupon the fuel can burn as a gas. The location of and direction of the fuel injection nozzles 44 and the centrally located toroidally shaped mixing ring 28 with respect to the gas pilot nozzle 34 eliminates the need for a fuel sump common to burners such as the double vortex type as no raw fuel collects due to the geyseric mixing within the burner. In addition, no steam or high pressure air is required for atomization of the fuel oil as is common with some burners. The injection nozzles 44 are of conventional configuration operating in the range of 300 to 700 psig.

The extremely efficient geyseric mixing action obtained in the burner assembly 10 is a product of the configuration of the mixing ring 28 and lower burning cone 26. A diverging discharge nozzle 22 is provided to enhance the aerodynamic flow of the discharge of the products of combustion and to shield the products of combustion from cold secondary air which otherwise may prematurely enter the burner and mix with the combustion gases resulting in recondensing of unburned fuel oil. The nozzle configuration thereby effectively increases the length of the combustion chamber and promotes tangential and gradual blending of the secondary air with the combustion gases.

By way of example, in a burner assembly having a housing of about 2 feet in height and 22 inches in diameter, the mixing ring 28 would have a diameter of about 6.5 inches across the open end thereof from outside edge to outside edge, a sloped inner surface 32 defining an angle of about 30° with respect to the vertical and the mixing surface 30 is defined by a radius of about 1.5 inches. Twelve bleed orifices are equally spaced about the sloped inner surface 32 with the lower surfaces 80 thereof being tangent to the outer mixing surface 30 at 82 as seen in FIG. 3. Six gas main orifices 36 are also equally spaced about the mixing ring. A lower burning cone 26 which defines the floor of the burner and mates with the edge of the mixing ring 28 is sloped about 50 degrees with respect to the vertical and has a height of about 4.5 inches. The discharge nozzle 22 defines a lower or inner diameter of about 8.5 inches, an outer diameter of about 14.75 inches and is sloped at about 30° with respect to the vertical. It is of course understood that burners constructed in accordance with the present invention can be of any desired size and the above dimensions are given solely by way of example and illustrate the relative sizes of one such burner. It should also be noted that burners constructed in accordance with the present invention are operable at any desired angular orientation. While the drawings illustrate the burner in an upright position with the open end thereof also being the upper end, the burner could also operate horizontally, at an angle or even vertically inverted such that the open nozzle 22 is at the lower end of the burner.

Figure 4:
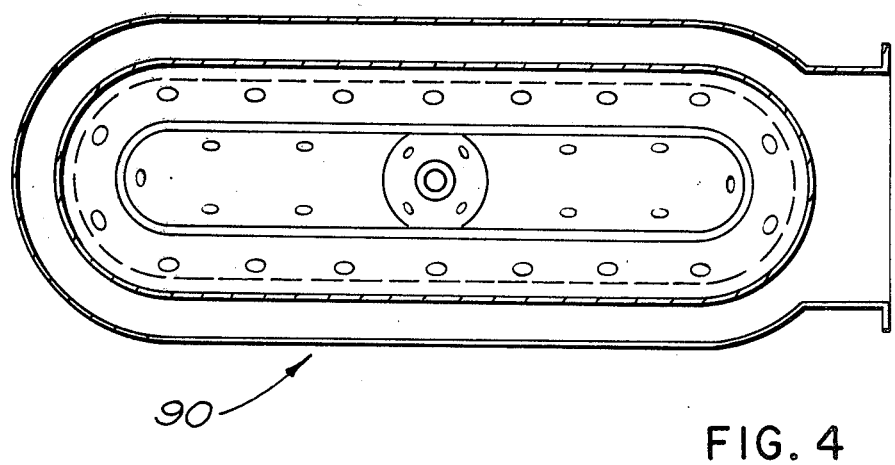
FIG. 4 is a plan view of an alternate embodiment of the burner of the present invention.

A second embodiment of the burner assembly is illustrated in FIG. 4. This embodiment differs from the prior embodiment solely in the oblong construction of the burner 90 and includes each of the elements found in the prior embodiment. The second embodiment is of significance in that it allows the burner assembly to be used as a line-type oil burner which was not previously possible due to the necessity in previously existing conventional burners to mix the oil and fuel in a circumferential swirling of the gases. Line-type burners which have been used for years in gas fire equipment have the advantage of distribution of the heat over a long narrow area which is desirable for heat processes wherein wide ducts are used such as in dryers, baking and curing ovens. Various changes and modifications may be made in carrying out the present invention without departing from the spirit and scope thereof. Insofar as these changes and modifications are within the purview of the appended claims, they are to be considered as part of the invention.

I claim:

1. A burner assembly comprising a housing having a discharge opening in the upper end thereof and a sloped lower surface therein, a pilot nozzle disposed in said housing, a mixing ring disposed about said pilot nozzle and having an annular concave outer mixing surface extending upwardly from said sloped lower surface, means disposed within said housing for directing air to said outer mixing surface of said mixing ring and means disposed within said housing for directing fuel to said outer mixing surface of said mixing ring, said air and fuel being caused to mix and roll upwardly within said housing by said mixing surface and upon ignition, to flow from said housing through said discharge opening therein.

2. The combination of claim 1 wherein said mixing ring is of a toroidal configuration and defines a frustoconical inner surface disposed about said pilot nozzle, said inner surface having a plurality of bleed orifices therein extending between said inner surface and said outer mixing surface of said mixing ring.

3. The combination of claim 1 wherein said fuel directing means comprises a plurality of apertures disposed about and extending through said outer mixing surface of said mixing ring, means for supplying gaseous fuel to said apertures, spray means adapted for fluid communication with a fuel supply for providing a spray of fuel oil toward said outer mixing surface and including means for selectively actuating said gaseous fuel supplying means or said spray means.

4. The combination of claim 1 wherein said air directing means comprises a plurality of shells mounted within said housing, said shells defining a combustion chamber within said housing and a tortuous air passageway for said air whereby air flow in said passageway is preheated for combustion.

5. The combination of claim 1 wherein said sloped lower surface and said mixing ring are of an oblong configuration.

6. A burner assembly comprising a housing having a discharge opening in the upper end thereof, a pilot nozzle mounted within said housing, a frustoconical lower burning surface disposed within said housing about said pilot nozzle, a toroidally-shaped mixing ring disposed within said housing about said pilot nozzle and having an annular concave outer mixing surface mating with and extending upwardly from said lower burning surface, means disposed within said housing for directing air to said outer mixing surface and means disposed within said housing for directing fuel to said outer mixing surface, said air and fuel being caused to mix and roll upwardly within said housing by said mixing surface and upon ignition, to flow from said housing through said discharge opening.

7. The combination of claim 6 wherein said mixing ring defines a frustoconical inner surface disposed about said pilot nozzle, said inner surface having a plurality of bleed orifices therein extending between said inner surface and said outer mixing surface.

8. The combination of claim 6 wherein said fuel directing means comprises a plurality of apertures disposed about and extending through said outer mixing surface of said mixing ring, means for supplying gaseous fuel to said apertures, spray means adapted for fluid communication with a fuel supply for providing a spray of fuel oil such that said spray is carried to said outer mixing surface by said air, and including means for selectively actuating said gaseous fuel supplying means or said spray means.

9. The combination of claim 6 wherein said housing, said lower burning surface and said mixing ring are of an oblong configuration.

10. The combination of claim 7 including a frustoconically shaped discharge nozzle disposed about said discharge opening in the upper end of said housing.

11. A burner assembly comprising an outer housing having an open upper end, and an air inlet adjacent the lower end thereof, a frustoconically shaped discharge nozzle disposed about said open upper end of said housing, a pilot nozzle mounted within said housing, a frustoconical lower burning surface disposed within said housing about said pilot nozzle, a toroidally shaped mixing ring disposed within said housing, said ring having an annular concave outer mixing surface mating with and extending upwardly from said lower burning surface and a frustoconical inner surface disposed about said pilot nozzle and having a plurality of bleed orifices therein extending between said inner surface and said outer mixing surface, said lower burning surface and said mixing ring defining an air plenum communicating with said air inlet in said housing, a plurality of shells mounted within said housing defining a combustion chamber and a tortuous air flow path extending between said plenum and said combustion chamber, means disposed within said housing for directing air through said tortuous path to said outer mixing surface such that the air flow through said passageway is preheated for combustion, and means disposed within said housing for directing fuel to said outer mixing surface, said air and fuel being caused to mix and roll upwardly within said housing by said outer mixing surface and upon ignition, to flow from said housing through said discharge nozzle.

12. The combination of claim 11 wherein said shells are concentrically mounted within said housing, one of said shells extending between the upper end of said housing and said lower burning surface and a second shell being carried by the first shell and disposed between said first shell and said housing, said first shell having means therein for directing air downwardly therethrough to said lower burning surface.

13. The combination of claim 12 wherein said first shell includes means for directing a portion of said air flow in said passageway upwardly through said discharge nozzle.

14. The combination of claim 12 wherein said fuel directing means comprises a plurality of apertures disposed about and extending through said outer mixing surface of said mixing ring, means for supplying gaseous fuel to said apertures, spray means adapted for fluid communication with a fuel supply for providing a spray of fuel oil such that said spray is carried to said outer mixing surface by said air, and including means for selectively actuating said gaseous fuel supplying means or said spray means.

* * * * *